United States Patent [19]

Wilson

[11] 4,234,215
[45] Nov. 18, 1980

[54] ROTARY PIPE JOINT

[75] Inventor: Lee E. Wilson, Dallas, Tex.

[73] Assignee: E-Systems, Inc., Dallas, Tex.

[21] Appl. No.: 912,489

[22] Filed: Jun. 5, 1978

[51] Int. Cl.³ ............................................. F16L 53/00
[52] U.S. Cl. ...................................... 285/41; 285/47; 285/190
[58] Field of Search ........................... 285/41, 190, 47

[56] References Cited

U.S. PATENT DOCUMENTS

| | | | |
|---|---|---|---|
| 1,805,335 | 5/1931 | Kermode et al. | 285/41 X |
| 2,127,073 | 8/1938 | Topping . | |
| 2,425,211 | 8/1947 | Strickland, Jr. . | |
| 2,701,146 | 2/1955 | Warren | 285/190 X |
| 2,772,897 | 12/1956 | Shaw et al. | 285/190 |
| 2,840,350 | 6/1958 | Pierce . | |
| 2,910,309 | 10/1959 | Snyder et al. . | |
| 3,017,202 | 1/1962 | Swaney | 285/41 |
| 3,057,646 | 10/1962 | Brumagim . | |
| 3,167,332 | 1/1965 | Simmers | 285/41 |
| 3,411,526 | 11/1968 | Schaefer | 285/190 X |
| 3,514,127 | 5/1970 | Brooker . | |
| 3,694,008 | 9/1972 | Slator et al. | 285/190 X |
| 4,017,102 | 4/1977 | Henderson | 285/41 |
| 4,154,446 | 5/1979 | Usry | 285/41 X |

*Primary Examiner*—Thomas F. Callaghan
*Attorney, Agent, or Firm*—Albert M. Crowder, Jr.; Robert V. Wilder

[57] ABSTRACT

A pressure-tight, rotary pipe coupling joins rotating, high temperature fluid transmission lines. Pressure seals of the coupling are maintained at a temperature lower than that of the high temperature or primary transmitted fluid by thermally insulating the seals from the high temperature fluid and by pumping a fluid coolant through annular cavities located adjacent the seals. A balanced pressure structure substantially eliminates thrust forces between the coupling members and reduces rotating friction.

21 Claims, 8 Drawing Figures

ROTARY PIPE JOINT

BACKGROUND OF THE INVENTION

This invention relates to high temperature fluid transmission piping, and more particularly to a rotary pipe coupling having apparatus for cooling the pressure seals.

In certain types of steam generating systems, the steam pipelines must be shifted from one position to another. For example, in a distributed solar energy collection system, the position of the steam generator must be shifted frequently to compensate for the motion of the sun. In such applications, the steam piping must have a number of rotary pipe couplings. Therefore, there is a need for a rotary joint that is mechanically reliable, has little fluid or thermal leakage, and rotates with minimal friction.

High-temperature rotary couplings are not new to the art, as shown by U.S. Pat. No. 3,057,646 to Brumagim which discloses a coupling that connects abutting steam pipes, and has a conduction path for carrying a fluid to cool the pressure seal. U.S. Pat. No. 2,127,073 to Topping illustrates an air-cooled steam pipe expansion joint in which the packing material is thermally isolated to some extent from the high-temperature fluid. These devices, however, do not provide the pressure seal thermal isolation, design simplicity, balanced pressure, and mechanical flexibility called for in current dynamic fluid piping systems.

SUMMARY OF THE INVENTION

In accordance with the present invention there is provided a rotary, high-temperature, pipe coupling with insulation and external cooling means for maintaining the pressure seals at a lower temperature than the transported high temperature fluid.

The rotary pipe joint of the present invention comprises a manifold having a rotating sleeve disposed therein. The manifold is stationary relative to the rotating sleeve and has incorporated therein high temperature fluid and cooling fluid transmission lines. Fluid coolant circulates through a first annular groove disposed on the interior surface of the manifold and thence through a transfer pipe to a second annular groove also disposed on the interior surface of the manifold. Pressure seals are disposed adjacent and on opposite sides of each of the fluid flow path annular grooves.

The rotating sleeve is disposed substantially within the manifold and has inner and outer tubular members separated by insulation. The rotating sleeve has an exterior annular groove aligned with the high temperature fluid transmission port in the manifold and the exterior annular groove is in fluid communication with the interior high temperature fluid flow path of the inner tubular member. Within the rotating sleeve there is a flow path which receives the coolant fluid from the second annular groove and transmits this fluid to an outlet port.

Sealing rings are disposed between the manifold and rotating sleeve and are located adjacent the annular grooves which carry cooling fluid. Flange members disposed on each end of the rotating sleeve maintain its position within the manifold. The rotating sleeve is not limited in its extent of rotation within the static manifold.

As an alternative embodiment the fluid transmission members are replaced with heat transfer fins for air cooling of the sealing rings.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
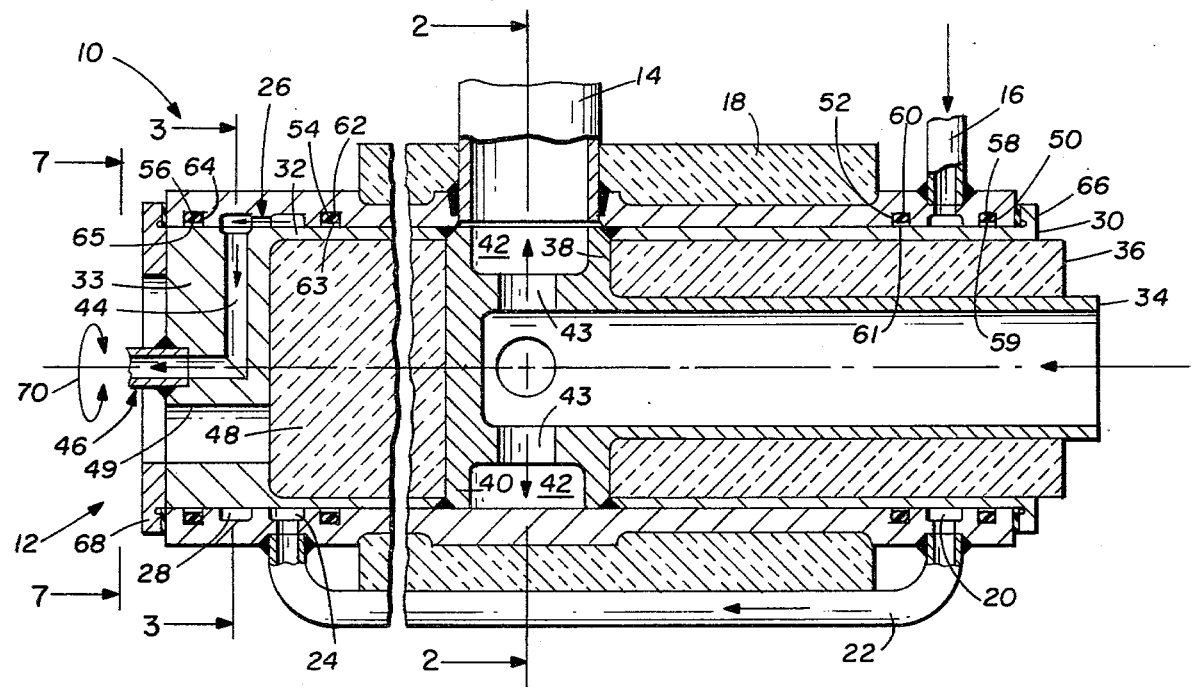
FIG. 1 is a cross-sectional view of a rotary pipe joint in accordance with the present invention.

In a steam generation system in which the steam is collected at varying positions and transported to a stationary turbine, the steam must be conducted through piping which utilizes flexible joints. For example, a solar energy collection system which uses a fixed concentration mirror has a moving line focus; the location of the line focus being dependent upon the relationship of the sun to the mirror. To collect energy in such a system, the collection device must move through a wide range of positions during the day in order to maintain itself at the line focus of the solar radiation. If the energy is collected by means of converting water to steam, the piping must transport the steam at high temperature and pressure. Rotary couplings used in such a system must withstand the high temperature and pressure while at the same time offering little resistance to the movement of the piping. In order to have an effective system, the coupling must also be reliable, inexpensive, and safe.

FIGS. 1, 2, 3 and 7 illustrate a rotary coupling in accordance with the present invention. The static manifold 10 encloses a rotating sleeve 12 which is free to turn within the manifold 10. Passing through the wall near the center of the manifold 10 is a high temperature fluid transmission port 14 and toward an end is a cooling fluid transmission port 16. A sheath of insulation 18 surrounds the exterior of the manifold 10.

Disposed on the interior surface of the manifold 10 is a first annular groove 20 which is in fluid communication with the cooling fluid port 16. The first annular groove 20 completely encircles the interior of the manifold 10 and is connected in fluid communication with a transfer tube 22 which is attached to the exterior of the manifold 10 opposite the cooling fluid port 16. Transfer tube 22 is connected to a second annular groove 24 which completely circles the interior of the manifold 10 and is located at the opposite end of the manifold 10 from the cooling fluid port 16. The second annular groove 24 is connected through a port 26 (see FIG. 3) opposite the transfer tube 22 to a third annular groove 28 likewise disposed on the interior surface of the manifold 10.

Figure 2:
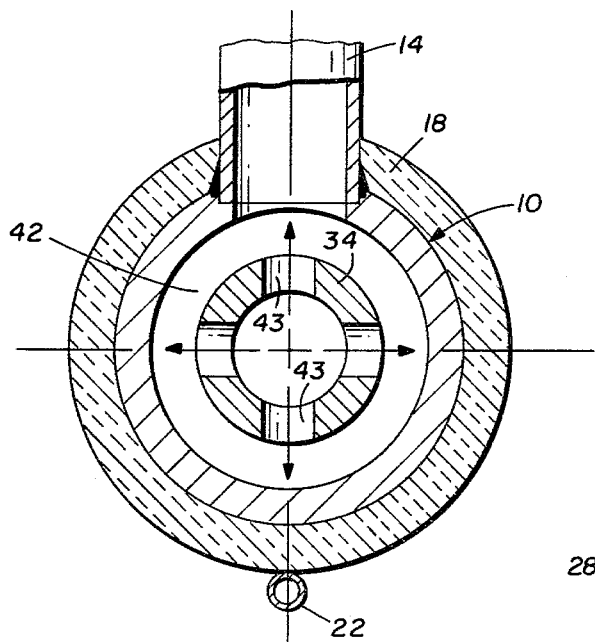
FIG. 2 is a cross-section view taken along line 2—2 of FIG. 1.

The rotating sleeve 12 comprises a first outer tubular member 30, a second outer tubular member 32 and in inner tubular member 34, all coaxial with the manifold 10. Disposed in the space between the outer tubular member 30 and the inner tubular member 34 is an insulation member 36. A first flange 38 is mechanically joined to both the outer tubular member 30 and the inner tubular member 34. This first flange is in turn joined to a second flange 40 to form an annular cavity 42 which is open to the interior of the manifold 10 and is in fluid communication with the high temperature fluid transmission port 14. The annular cavity 42 is connected through four fluid flow ports 43 to the interior of the inner tubular member 34. The ports 43 are disposed at 90° angles about the axis of the inner tubular member 34. This structure is illustrated in FIG. 2 which shows a cross-section view taken along the line 2—2.

The second flange 40 is joined to the second outer tubular member 32 which is coaxial with and disposed adjacent to the interior surface of the manifold 10. Disposed within a cap 33 joined to the second outer tubular member 32 is a cooling fluid line 44 which is open to the third annular groove 28 and connected to a cooling fluid port 46. A block of insulation 48 is disposed between the cooling fluid line 44 and the second flange 40. Hole 49 (see FIG. 3) provides insulation access.

Pressure sealing rings 50, 52, 54 and 56 are disposed respectively within annular grooves 58, 60, 62 and 64 which are formed within the interior surface of the manifold 10. If it is necessary in a particular application to reduce rotating friction to an absolute minimum, low friction flexible bands 59, 61, 63 and 65 are installed between the sealing rings and the exterior surface of the rotating sleeve 12.

As an alternative structure, the sealing rings 50, 52 54 and 56 can be disposed in annular grooves (not shown) which are formed in the exterior surface of the rotating sleeve 12.

Figure 7:
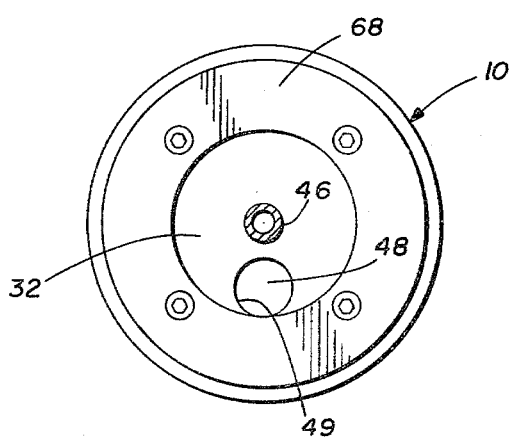
FIG. 7 is a cross-section view along line 7—7 of FIGS. 1 and 5.

The axial position of the rotating sleeve 12 relative to the manifold 10 is fixed by means of a flange 66 joined to the end of the first outer tubular member 30 and a disc 68 mechanically fastened to the cap 33 of the second outer tubular member 32 (see FIG. 7).

In a flexible coupling which transmits a pressurized fluid at a high temperature, approximately 1,000 psi and 1,000° F., it is necessary to use pressure seals between the rotating metal components to prevent fluid leakage. However, since the seals are made of a flexible material, they are subject to decomposition, loss of sealing capability, and increased wear at the elevated temperatures. High temperature sealant materials are substantially more expensive than lower temperature sealants, and despite the increased cost, the high temperature materials have a relatively short operational life. Therefore, it is desirable to cool the pressure seals and maintain them at a temperature substantially lower than that of the fluid being transmitted through the flexible joint. Elastomeric pressure seals can operate at temperatures up to about 500° F., but for maximum life it is preferable to hold the seal temperature to 300° F. or less. This temperature can be maintained since the ambient temperature of the cooling fluid, generally water, is 70° to 100° F. Such cooling is provided by the present invention.

Operation of the preferred embodiment of the rotary joint is described with reference to FIG. 1. Fluid is transmitted at high temperature and high pressure through the interior of the inner tubular member 34 through the ports 43 into the annular cavity 42 and from there to the high temperature fluid transmission port 14 in the manifold to an external high temperature fluid line. The rotating sleeve 12 is free to rotate in either direction within the manifold 10 as shown by the arrow 70. The annular cavity 42 extends around the circumference of the rotating sleeve 12 to maintain fluid communication between the interior of the inner tubular member 32 and the high temperature fluid transmission port 14 at any angular relationship between the two members. By transferring the high temperature fluid in this manner, a balanced axial pressure is produced between the rotating members. This structure essentially eliminates thrust forces between the members, thereby eliminating the need for thrust bearings which in turn reduces the cost, complexity and weight of the joint.

Fluid coolant for the O-ring style pressure seals 50, 52, 54 and 56 is provided through the cooling fluid port 16. This port provides fluid which is circulated through the first annular groove 20 where it absorbs heat from the surrounding metal members comprising the manifold 10 and the outer tubular member 30. As heat is absorbed from these two metallic members, the sealing rings 50 and 52 are cooled to a temperature that is lower than that of the high temperature fluid being transmitted. After the cooling fluid has passed through the first annular groove 20, it is carried by the transfer tube 22 to the second annular groove 24. The flow of coolant through the second annular groove 24 cools the sealing rings 54 and 56 in the same manner as previously described. After the coolant has passed through the second annular groove 24 it is transmitted through the port 26 to a third annular groove 28. The port 26 is located on the opposite side of the manifold 10 from the transfer tube 22 to insure that coolant will circulate completely around the second annular groove 24 irrespective of the angular position of the cooling fluid line 44 relative to the manifold 10.

The third annular groove 28 serves as a means for transmitting the cooling fluid back to the rotating inner member. The cooling fluid line 44 disposed in the second outer tubular member 32 and cap 33 is open at all angles of rotation to the third annular groove 28 in order to receive cooling fluid and transmit it to the cooling fluid port 46. By transferring the cooling fluid from the static manifold 10 to the rotating sleeve 12, there is also provided a flexible joint for the transmission of the cooling fluid. Thus, the cooling fluid line and high temperature fluid transmission line can be flexed and moved together.

In addition to the fluid cooling, thermal insulation is provided to isolate the seals from the high temperature fluid. The insulation 36 separates the inner tubular member 34, which is in contact with the high temperature fluid, from the first outer tubular member 30, which is in contact with the sealing rings. The insulation 48 separates the second flange 40, which is in contact with the high temperature fluid, from the second outer tubular member 32, which is in physical contact with the sealing rings. There is also a metal heat conduction path between the hot fluid and the sealing rings through the first outer tubular member 30, however, this is a relatively thin-walled member which has only a small cross-sectional area that inhibits the flow of heat. In a similar manner, the second outer tubular member 32 provides a heat flow path between the second flange 40 and the sealing rings 54 and 56. But this is also a thin-walled member with a small cross-sectional area that inhibits the flow of heat.

Due to the high temperature and pressure present in the rotary joint, it is necessary to use materials which are not adversely affected by these conditions. The metal members and tubing are preferably constructed of stainless steel or INCONEL (Trademark of Huntington Alloys). Rubber, TEFLON (Trademark of Dupont) or carbon can be used for the sealing rings and glass fiber of KAYLO (Trademark of Owens-Corning Fiberglass Corp.) insulation is suitable for the insulation sheaths and block.

When, for example, the rotary coupling is used as a part of an overall steam generation system, the boiler water can be used as the coolant for the coupling. The pressure of the boiler water, which is up to 1,000 psi, is always greater than the system steam pressure of approximately 800 psi, therefore, if a leak develops in the coupling, water will be forced into the steam rather than the steam venting away from the coupling. Water which leaks into the steam is removed in a separator before the steam enters the turbine. This provides a substantial safety advantage for the coupling as well as for adjacent equipment and personnel. An uncontrolled steam leak could easily destroy the joint and nearby equipment, but due to the higher pressure of the water, any leak will cause water to flow into the steam line. In addition, the heat absorbed by the fluid coolant will serve to preheat the incoming boiler water and thus not degrade the efficiency of the system.

Figure 4:
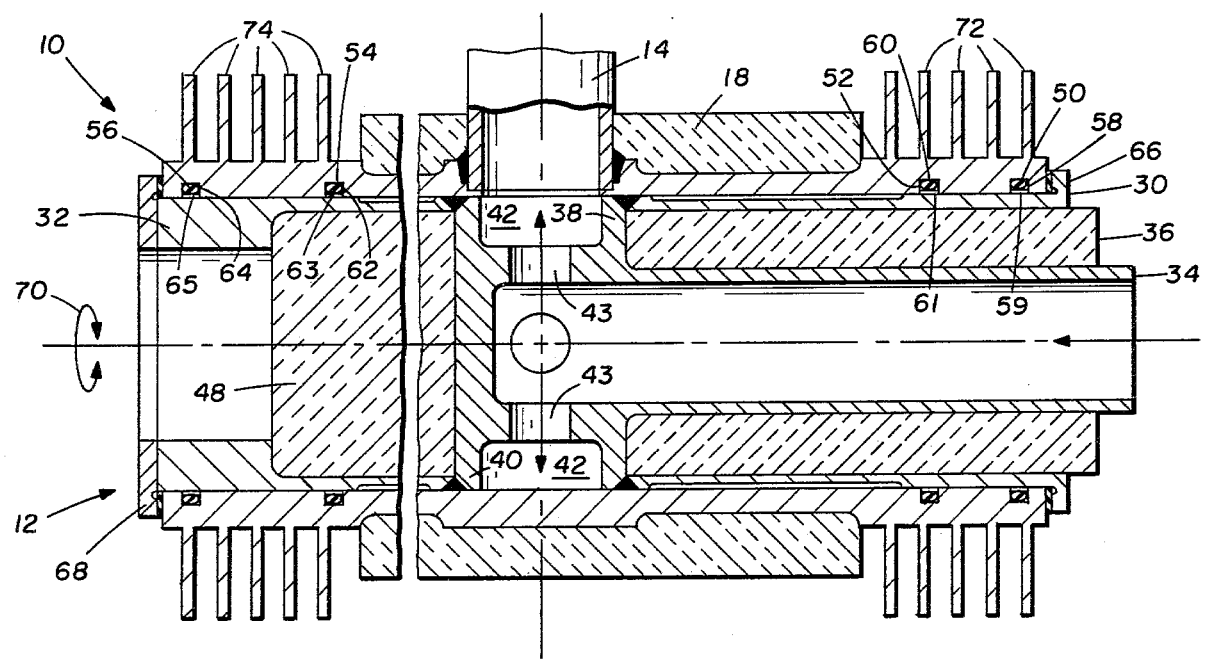
FIG. 4 is a cross-section view of an air-cooled embodiment of the present invention.

An alternative embodiment of the present invention is shown in FIG. 4. This embodiment utilizes air to cool the sealing rings rather than a cooling fluid. The air-cooled structure is similar to the embodiment shown in FIG. 1 but does not include the fluid handling features comprising the cooling fluid ports 16 and 46, annular grooves 20, 24 and 28, transfer tube 22, port 26 and line 44. In place of these elements are a first set of cooling fins 72 joined to the exterior of the manifold 10 near the sealing rings 50 and 52 and a second set of cooling fins 74 also joined to the exterior of the manifold 10 but located near the sealing rings 54 and 56.

Cooling fins 72 and 74 transfer heat from the manifold 10 through the fins to the surrounding air. The air is caused to circulate by convection or natural wind currents. Although this embodiment generally does not cool the sealing rings as effectively as does the liquid-cooled embodiment, it does result in a simpler design with fewer components.

Figure 3:
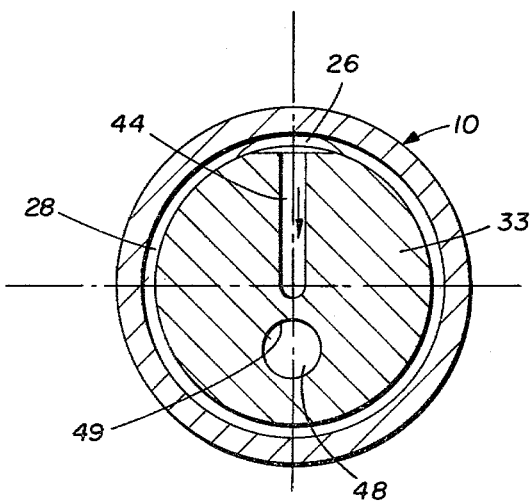
FIG. 3 is a cross-section view along line 3—3 of FIG. 1.
Figure 6:
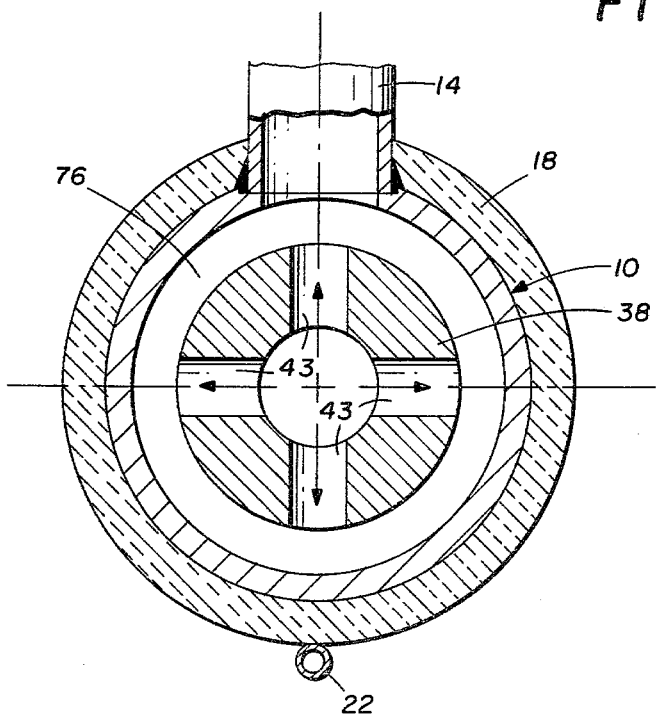
FIG. 6 is a cross-section view along line 6—6 of FIG. 5.

A still further embodiment of the present invention is illustrated in FIGS. 3, 5, 6 and 7. This embodiment differs from that shown in FIG. 1 only in that the annular cavity 42 in FIG. 1 is replaced by an annular cavity 76 in FIG. 5. In this embodiment, annular cavity 76 is disposed on the inside of manifold 10 rather than on the exterior of the rotating sleeve 12. Fluid is transmitted from the interior of the inner member 34, through the ports 43, into the annular cavity 76 and from there into the high temperature fluid transmission port 14. FIG. 3 is a cross-section view taken along line 3—3, FIG. 6 is a cross-section view taken along line 6—6 and FIG. 7 is a cross-section view taken along line 7—7.

Figure 8:
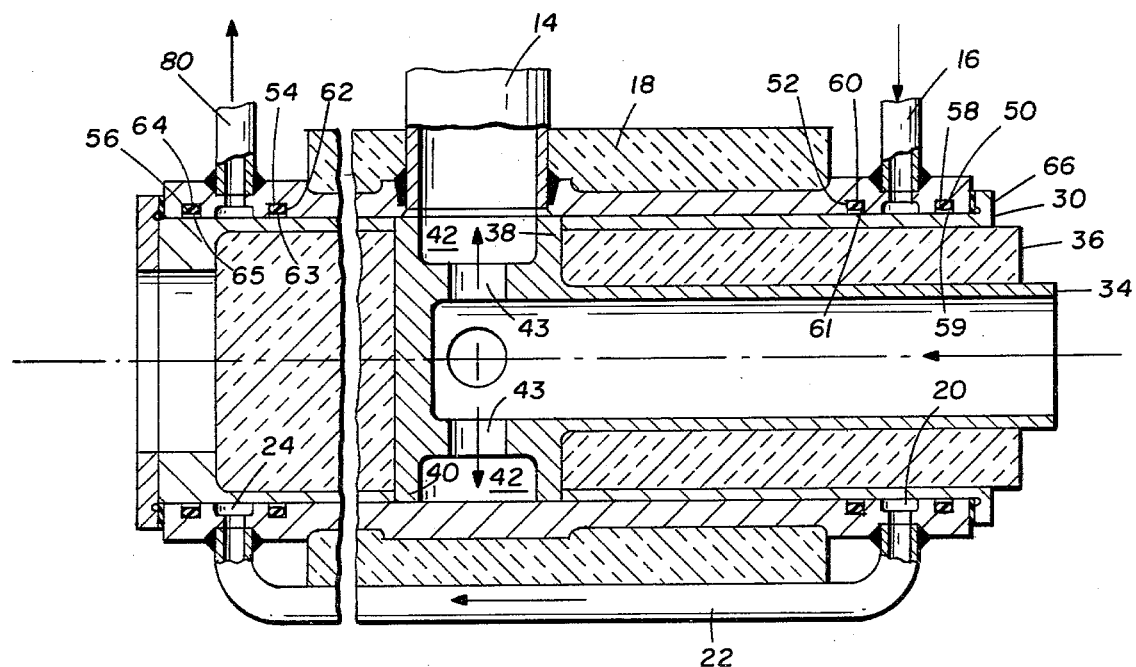
FIG. 8 is a cross-section view of a stationary fluid-cooled embodiment of the present invention.
Figure 5:
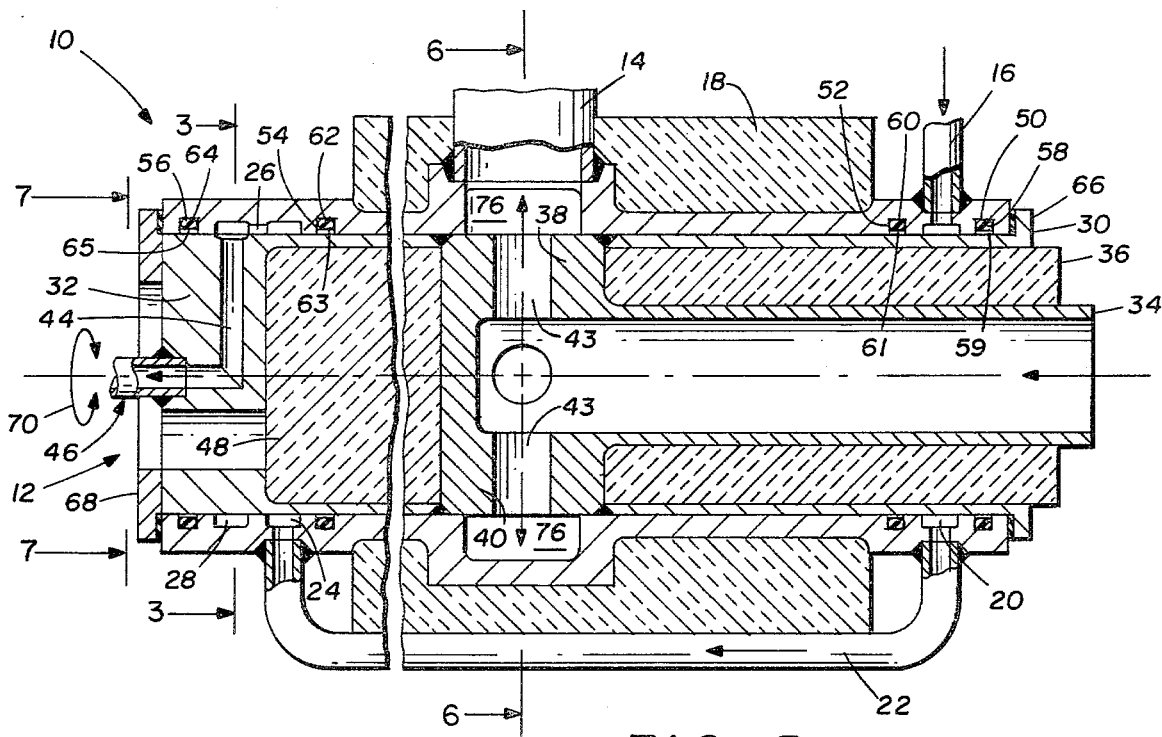
FIG. 5 is a cross-section view of a further embodiment of the present invention.

A further embodiment of the present invention is shown in FIG. 8. This embodiment is similar to that shown in FIG. 5 but without the port 26, the third annular groove 28 and the cooling fluid line 44. In this embodiment the manifold 10 is in a stationary mount with the cooling fluid entering port 16 and passing out of the stationary manifold 10 through a cooling fluid port 80.

In all of the embodiments illustrated, both the high temperature fluid being transported and the cooling fluid can pass in either direction through the flow paths.

Likewise, in all embodiments illustrated, the primary transported fluid can be a low temperature or cryogenic fluid where the seals are maintained at a temperature higher than that of the primary transported fluid.

Also, either the manifold 10 or the rotating sleeve 12 can be held stationary and the other rotated since the relative motion is the same in either case.

Therefore, in accordance with the present invention, there is provided a rotary, balanced pressure coupling for the transmission of high-temperature fluid in which the seals are cooled to operate at a temperature substantially lower than that of the high temperature fluid.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A rotary pipe joint comprising:
  (a) a first tubular member having a transversely disposed fluid transmission port,
  (b) a second tubular member disposed within said first tubular member and coaxially rotatable relative to said first tubular member,
  (c) fluid transmission means having an axis coplanar with the axis of said fluid transmission port and connecting the interior of said second tubular member to said fluid transmission port,
  (d) first pressure sealing means disposed between said first tubular member and said second tubular member to one side of the fluid transmission port,
  (e) second pressure sealing means disposed between said first tubular member and said second tubular member to the same side of the fluid pressure port as said first pressure sealing means and displaced therefrom,
  (f) third pressure sealing means disposed between said first tubular member and said second tubular member to the opposite side of the fluid transmission port as said first and second pressure sealing means,
  (g) fourth pressure sealing means disposed between said first tubular member and said second tubular member to the same side of the fluid transmission port as said third pressure sealing means and displaced therefrom,
  (h) means for cooling said first and second pressure sealing means by applying a coolant therebetween,
  (i) second means for cooling said third and fourth pressure sealing means by applying a coolant therebetween, and
  (j) means for interconnecting said first and second means for cooling.

2. A rotary pipe joint as recited in claim 1 wherein said means for cooling comprises an annular groove disposed within the inner surface of said first tubular member adjacent said pressure sealing means and a fluid coolant passing through said annular groove.

3. A rotary pipe joint as recited in claim 1 wherein said second tubular member includes inner and outer tubular members coaxial with said first tubular member.

4. A rotary pipe joint as recited in claim 3 further including insulation disposed between said inner and outer members.

5. A rotary pipe joint as recited in claim 1 wherein said fluid transmission means comprises an annular groove disposed on the exterior of said second tubular member, said annular groove open to said fluid transmission port in said first tubular member and ports in said second tubular member connecting the interior of said second tubular member to said annular groove.

6. A rotary pipe joint as recited in claim 1 wherein said fluid transmission means comprises an annular groove disposed on the interior of said first tubular member in fluid communication with said fluid transmission port and port means within said second tubular member communicating the interior of said second tubular member with said annular groove.

7. A rotary pipe joint as recited in claim 1 further including a flexible band disposed between said pressure sealing means and said second tubular means.

8. A rotary pipe joint as recited in claim 1 wherein said pressure sealing means comprises an O-ring disposed in an annular groove formed in the inner surface of said first tubular member.

9. A rotary pipe joint having a cooled pressure seal, comprising:
  (a) a first tubular member having,
    (i) a first fluid transmission port disposed through the wall of said first tubular member,
    (ii) a second fluid transmission port disposed through the wall of said first tubular member,
    (iii) a first annular groove disposed circumferentially within the interior surface of said first tubular member and in fluid communication with said second fluid transmission port,
    (iv) a second annular groove disposed circumferentially within the interior surface of said first tubular member and spaced from said first annular groove, and
    (v) first fluid communication means connecting said first annular groove and said second annular groove,
  (b) a second tubular member disposed substantially within said first tubular member comprising,
    (i) an outer tubular member disposed adjacent the interior surface of said first tubular member,
    (ii) an inner tubular member spaced inside of and coaxial with said outer tubular member,
    (iii) a first flange joined to said outer tubular member and to said inner tubular member,
    (iv) a second flange joined to said first flange to form an annular cavity in fluid communication with said first fluid transmission port in said first tubular member,
    (v) second fluid communication means connecting the interior of said inner tubular member to said annular cavity,
    (vi) a third tubular member joined to said second flange, coaxial with said outer tubular member, adjacent the interior surface of said first tubular member, and having a third fluid transmission port disposed therein,
  (c) third fluid communication means connecting said second annular groove to said third fluid transmission port,
  (d) a first sealing ring disposed between the inner surface of said first tubular member and the outer surface of said second tubular member, coaxial with said first tubular member and disposed essentially adjacent said first annular groove, and
  (e) a second sealing ring disposed between the inner surface of said first tubular member and the outer surface of said third tubular member, coaxial with said first tubular member and disposed essentially adjacent said second annular groove.

10. A rotary pipe joint as recited in claim 9 further including means for maintaining a fixed longitudinal position of said second tubular member relative to said first tubular member.

11. A rotary pipe joint as recited in claim 9 further including:
  (a) a third annular groove disposed circumferentially within the interior surface of said first tubular member and containing said first sealing ring, and
  (b) a fourth annular groove disposed circumferentially within the interior surface of said first tubular member and containing said second sealing ring.

12. A rotary pipe joint as recited in claim 9 further including:
  (a) a third sealing ring disposed between the inner surface of said first tubular member and the outer surface of said second tubular member, coaxial with said first tubular member and disposed essentially adjacent said first annular groove opposite said first sealing ring, and
  (b) a fourth sealing ring disposed between the inner surface of said first tubular member and the exterior surface of said second tubular member, coaxial with said first tubular member and disposed essentially adjacent said second annular groove opposite said first sealing ring.

13. A rotary pipe joint as recited in claim 9 wherein said third fluid communication means comprises:
  (a) a fifth annular groove disposed circumferentially within the interior surface of said first tubular member,
  (b) fourth fluid communication means connecting said second annular groove to said fifth annular groove, and
  (c) fifth fluid communication means disposed within said third tubular member and connecting said fifth annular groove to said third fluid transmission port.

14. A rotary pipe joint as recited in claim 9 wherein said first fluid communication means is a transfer tube attached to the exterior surface of said first tubular member.

15. A rotary pipe joint as recited in claim 9 further including:
  (a) a first thermal insulation member disposed in an annulus formed by said outer tubular member and said inner tubular member, and
  (b) a second thermal insulation member disposed within said third tubular member and adjacent said second flange.

16. A rotary pipe joint as recited in claim 9 further including:
  (a) a first flexible band disposed between said first sealing ring and the exterior surface of said second tubular member, and
  (b) a second flexible band disposed between said second sealing ring and the exterior surface of said second tubular member.

17. A rotary pipe joint comprising:
  (a) a first tubular member having a transversely disposed fluid transmission port, (b) a second tubular member disposed within said first tubular member and coaxially rotatable relative to said first tubular member,
(c) first fluid transmission means connecting the interior of said second tubular member to said fluid transmission port,
(d) first pressure sealing means disposed between said first tubular member and said second tubular member,
(e) second pressure sealing means disposed between said first tubular member and said second tubular member opposite said fluid transmission port from said first pressure sealing means,
(f) a first annular groove disposed within the interior surface of said first tubular member adjacent said first pressure sealing means,
(g) a second annular groove disposed within the interior surface of said first tubular member adjacent said second pressure sealing means,
(h) second fluid transmission means connecting said first annular groove to said second annular groove,
(i) a first fluid conduit joined to said first tubular member and in fluid communication with said first annular groove, and
(j) a second fluid conduit joined to said first tubular member and in fluid communication with said second annular groove.

18. A rotary pipe joint comprising:
(a) a first tubular member having a transversely disposed fluid transmission port,
(b) a second tubular member disposed within said first tubular member and coaxially rotatable relative to said first tubular member,
(c) fluid transmission means connecting the interior of said second tubular member to said fluid transmission port,
(d) first pressure sealing means disposed between said first tubular member and said second tubular member to one side of the fluid transmission port,
(e) second pressure sealing means disposed between said first tubular member and said second tubular member to the same side of the fluid pressure port as said first pressure sealing means and displaced therefrom,
(f) third pressure sealing means disposed between said first tubular member and second tubular member to the opposite side of the fluid transmission port as said first and second pressure sealing means,
(g) fourth pressure sealing means disposed between said first tubular member and said second tubular member to the same side of the fluid transmission port as said third pressure sealing means and displaced therefrom,
(h) means for cooling said first and second pressure sealing means by applying a coolant therebetween,
(i) second means for cooling said third and fourth pressure sealing means by applying a coolant therebetween,
(j) means for interconnecting said first and second means for cooling,
(k) first insulation means disposed in said second tubular member to one side of said fluid transmission port, and
(l) second insulation means disposed in said second tubular member to the other side of said fluid transmission port from said first insulation means.

19. A rotary pipe joint as recited in claim 18 wherein said second tubular member includes inner and outer tubular members coaxial with said first tubular member to said one side of said fluid transmission port, said first insulation means being disposed between said inner and outer members, and wherein said second tubular member defines a hollow cavity therein to said other side of said fluid transmission port, said second insulation means being disposed in said hollow cavity.

20. A rotary pipe joint as recited in claim 19 wherein said fluid transmission means comprises a first flange joining said inner and outer tubular members which extend rightwardly therefrom, and a second flange from which extends leftwardly an outer tubular member defining said hollow cavity, said first and second flanges being joined to form an annular cavity in fluid communication with said fluid transmission port.

21. The invention as recited in claim 19 wherein said pressure sealing means includes first and second seals disposed on opposite sides of each fluid transmission port, and wherein said first and second tubular members each define a heat conduction path between said fluid transmission port and each of said first and second seals, each said first and second tubular members being thin-walled of small cross-sectional area along said path inhibiting heat flow therealong.

* * * * *